United States Patent
Chard

[19]

[11] Patent Number: 5,867,091
[45] Date of Patent: Feb. 2, 1999

[54] VEHICLE SECURITY SYSTEM

[75] Inventor: Jonathon Chard, Solihull, England

[73] Assignee: Rover Group Limited, Warwick, England

[21] Appl. No.: 765,803

[22] PCT Filed: Jul. 19, 1995

[86] PCT No.: PCT/GB95/01699

§ 371 Date: Jan. 15, 1997

§ 102(e) Date: Jan. 15, 1997

[87] PCT Pub. No.: WO96/03730

PCT Pub. Date: Feb. 8, 1996

[30] Foreign Application Priority Data

Jul. 28, 1994 [GB] United Kingdom .................. 94/15196

[51] Int. Cl.⁶ .................................................. B60R 25/10
[52] U.S. Cl. ................ 340/426; 340/425.5; 340/309.15; 340/514; 340/522; 340/566; 180/287; 307/9.1; 307/10.2; 701/34; 367/95
[58] Field of Search ................................. 340/426, 425.5, 340/428, 430, 435, 436, 309.15, 514, 566, 903, 522, 565, 438; 307/10.2, 10.8, 10.1, 9.1, 141, 141.4; 180/167, 168, 169, 170, 287; 367/93, 94, 95, 96; 342/61, 70; 701/29, 34

[56] References Cited

U.S. PATENT DOCUMENTS

| | | | |
|---|---|---|---|
| 4,012,732 | 3/1977 | Herrick | 340/309.15 |
| 4,316,176 | 2/1982 | Gee et al. | 340/442 |
| 4,543,568 | 9/1985 | Hwang | 340/309.15 |
| 4,682,153 | 7/1987 | Boozer et al. | 340/309.15 |
| 4,710,750 | 12/1987 | Johnson . | |
| 4,833,450 | 5/1989 | Buccola et al. | 367/94 |
| 4,871,993 | 10/1989 | Hayashi et al. | 340/444 |
| 5,164,703 | 11/1992 | Rickman | 340/566 |
| 5,181,010 | 1/1993 | Chick | 340/426 |
| 5,235,315 | 8/1993 | Cherr et al. | 340/435 |
| 5,285,189 | 2/1994 | Nowicki et al. | 340/447 |
| 5,387,897 | 2/1995 | Bechtle et al. | 340/426 |
| 5,598,141 | 1/1997 | Grasmann et al. | 340/426 |

FOREIGN PATENT DOCUMENTS

| | | |
|---|---|---|
| 0252230 | 1/1988 | European Pat. Off. . |
| WO 93/19385 | 9/1993 | WIPO . |

*Primary Examiner*—Nina Tong
*Attorney, Agent, or Firm*—Davis and Bujold

[57] ABSTRACT

A vehicle alarm comprises of a control unit (2) coupled to a message center (22) and an ultrasonic movement sensor (20). The ultrasonic movement sensor (20) is automatically activated when the vehicle ignition is switched off. If movement is not detected in the time period between switching the ignition off and the driver's door being closed, then the ultrasonic movement sensor (20) is deemed to have failed. A count of such failures is kept and when a predetermined number of such failures has occurred, a warning message is displayed on the message center (22). If movement is detected in the time period, the count is reset to zero. In this way, the alarm can automatically determine whether or not the ultrasonic movement sensor (20) is functioning correctly.

24 Claims, 2 Drawing Sheets

VEHICLE SECURITY SYSTEM

FIELD OF THE INVENTION

This invention relates to vehicle security systems which include movement sensors for detecting movement within the vehicle. In such a system, when the vehicle is left by the driver, the alarm is set and any subsequent movement sensed within the vehicle is assumed to be that of an intruder and an alarm is raised accordingly. Thus the successful operation of such an alarm relies on the movement sensing means always being in functioning order.

BACKGROUND OF THE INVENTION

In prior systems, it has been possible for the movement sensing means to develop a fault which at least partially prevents movement being detected in the vehicle and for the driver not to know the fault has developed. In such a situation, the alarm will provide little or no protection against intrusion although no indication of this lack of protection will be given.

Such a vehicle alarm is disclosed in International Patent Application No. WO/GB93/19385.

SUMMARY OF THE INVENTION

It is an object of the present invention to automatically detect a fault in the movement sensing means of a vehicle alarm.

Accordingly the present invention provides a vehicle security system comprising movement detecting means for detecting movement inside a vehicle, sensing means for sensing the state of at least one component of the vehicle, and control means, the control means being arranged to identify by means of the sensing means a period when movement inside the vehicle would be expected, to monitor for movement within that period, and, if movement is not detected during said period, to initiate an error procedure.

Preferably the error procedure comprises altering a count value, which may be reset when movement is sensed in the said time period.

Preferably the system further comprises fault indication means, and the control means is arranged to indicate an error via the fault indication means when said count value reaches a predetermined value.

Preferably the sensing means comprises switch sensing means for sensing when an ignition switch is put in a predetermined position, and said period is started when the ignition switch is put in said predetermined position.

Preferably the system further comprises door sensing means for sensing a door being closed, and said period is that between the ignition switch being put in said predetermined position and the door being closed.

The putting of the ignition switch in a predetermined position in many cases indicates the beginning of a particular action by the driver. For example, if the predetermined position is an "off" position then usually the driver will next remove the key from the ignition switch and exit the vehicle, closing the driver's door behind him. Thus in most cases, the movement sensing means should if it is functioning correctly, sense movement during the said time period. By allowing the count value to reach a predetermined value, 5 for example, before generating a fault signal, the confidence of the fault detection is increased. Advantageously, the door sensed by the door sensing means is the drivers door.

In a preferred embodiment, the count value is reduced and is preferably reset to zero when movement is successfully sensed during the time period. Preferably the control means is operable to ignore a failure to detect movement during the time period in certain predetermined situations by neither incrementing nor reducing the count value. One such situation may occur when a driver has switched off the ignition and is just sitting in the car without having opened and closed the door. The driver may not be making enough movement to be sensed and thus a failure to detect movement may not indicate a fault with the movement sensing means. Preferably therefore, the control unit is operable to ignore a failure to detect movement when the time period after putting the ignition switch in the predetermined position exceeds a predetermined length (60 seconds for example), when the ignition switch is moved from its predetermined position, from "off" to "on" for example, and/or when the vehicle is locked during the said time period.

The movement sensing means may be activated automatically when the switch sensing means senses the predetermined switch position of the ignition switch. Preferably and particularly when the movement sensing means is sensitive to air movement in the vehicle, automatic activation of the movement sensing means does not occur unless all doors, windows, sunroof, tailgate and the like are closed. Alternatively, the movement sensing means may be activated at all times. In either case, even though movement may be detected by the sensing means, an alarm is not raised unless the alarm has been set.

The fault signal may advantageously cause the display of a fault message on a display device in the vehicle. The message may be caused to appear only in response to an attempt to set the alarm. Furthermore, if a fault has been detected other security features of the vehicle such as deadlocking of the doors (i.e. preventing the doors from being unlockable from inside the vehicle), may be deliberately disabled.

BRIEF DESCRIPTION OF THE DRAWINGS

The invention will now be described by way of example, with reference to the accompanying drawings in which.

DESCRIPTION OF THE PREFERRED EMBODIMENTS

Figure 1:
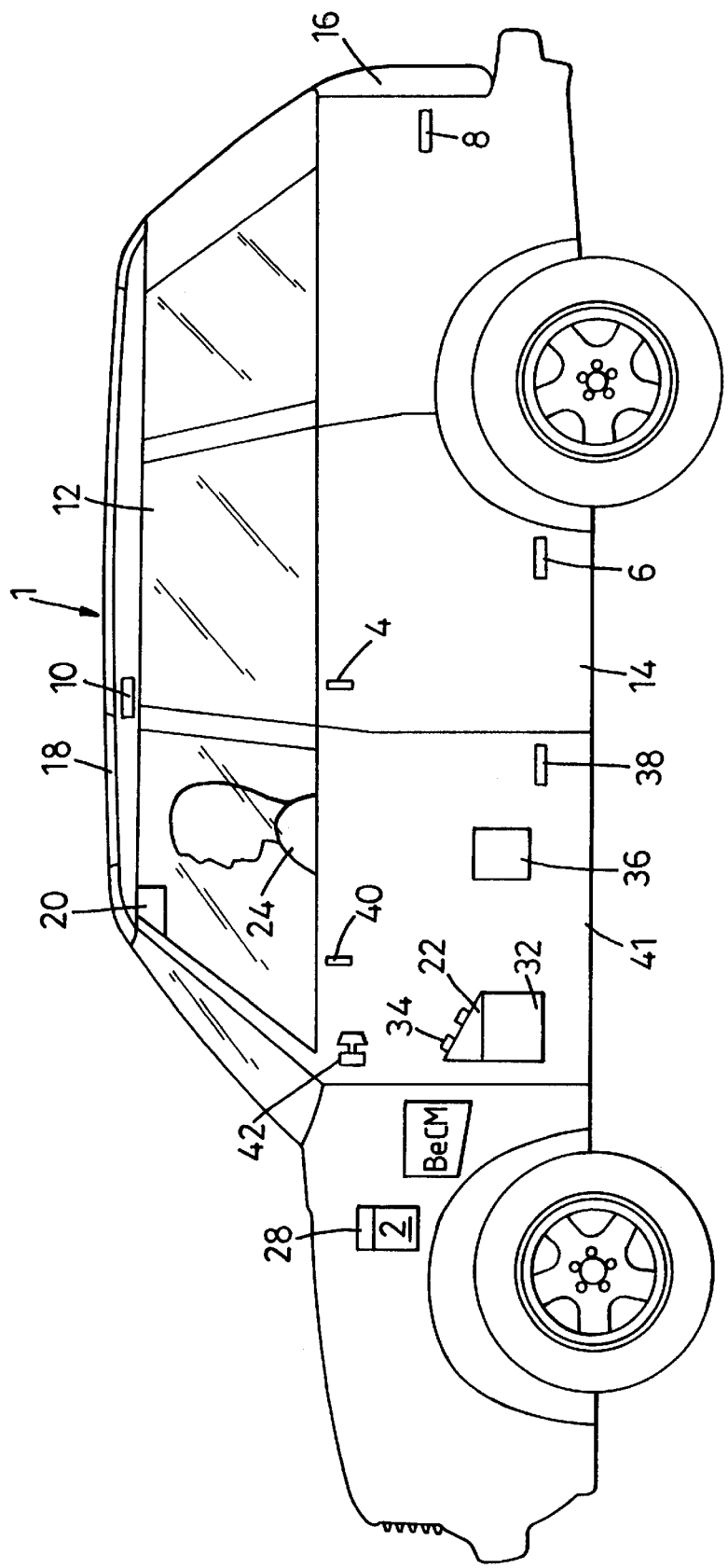
FIG. 1 is a side view of a vehicle including a security system according to the invention.
Figure 2:
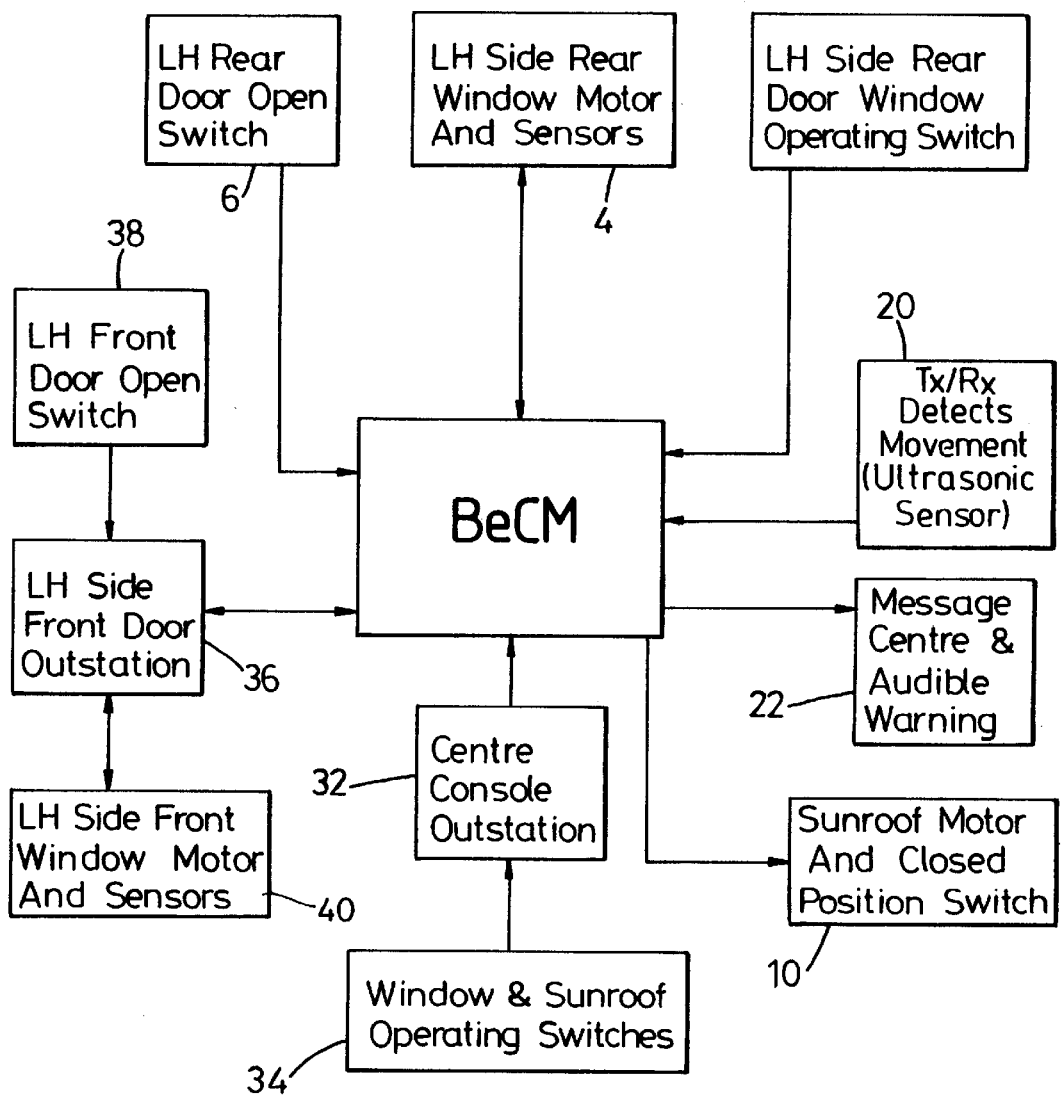
FIG. 2 is a schematic block diagram of the system of FIG. 1.

The security system for a vehicle 1 in accordance with the present invention includes control means comprising an engine control unit 2 which operates the vehicle immobilisation, and a body electrical control module BeCM. The control module has direct links with sensors 4, 6, 8, 10 for both rear windows 12, both rear doors 14, the tailgate 16 and the sunroof 18 which detect whether they are open or shut and when they move between those two conditions. The control module BeCM also has direct links with motors (not shown) for both rear windows 12, both rear door locks 14, and the sunroof 18, as well as an ultrasonic sensor 20 for detecting movement in the vehicle, a message centre and audible warning unit 22 which communicates information to the driver 24, and a radio frequency (R.F.) receiver 28 which receives R.F. signals from a hand held transmitter (not shown). It is to be appreciated that the movement detection means comprises a transmitter and receiver for transmitting and receiving respectively radiant energy of a predetermined waveband. The control module BeCM is also linked through a centre console outstation 32 to window and sunroof operating switches 34, and through left and right hand side front door outstations 36 to respective lock motors (not shown), sensors 38, window sensors 40 and window motors (not shown) for the front passenger and driver doors 41.

In operation, the control unit 2 coordinates a self-check procedure to determined whether the ultrasonic sensor 20 is operating correctly. If a fault is found, the driver is warned via a suitable message appearing on the message centre 22. Furthermore, if a fault has been detected other security features of vehicle 1, such as deadlocking doors 14, 41, may be deliberately disabled.

The procedure starts when the driver turns the ignition switch 42 to the off position. This event can be detected by the control unit 2 by monitoring the voltage level on the ignition circuit. When the ignition is off, the control unit 2 checks that all doors, sunroof and tailgate are shut. If they are shut then the ultrasonic sensor 20 is automatically activated regardless of any driver action to arm the alarm or alternatively, it may be activated at all times. If the control unit 2 then detects, within 60 seconds from when the ignition was turned off, is that the driver's door 41 has opened and then closed without any movement being detected by the ultrasonic sensor 20, the sensor is deemed to have failed and this failure is added to a count of such failures maintained by the control unit 2. When the count reaches five, the message centre 22 is instructed to display a fault message telling the driver that the ultrasonic sensor 20 has failed. The factor which determines the end of the period is dependent on the sequence of events after the start of the period. If movement is detected within 60 seconds of the ignition switch 42 being turned to the off position and before the driver's door 41 has closed, then the count of failures is reset to zero since the ultrasonic sensor 20 is deemed to be working correctly. If during the period of time between the ignition being switched off and the driver's door 41 being closed, the ignition switch 42 is turned on again, the vehicle 1 is locked, or a time period of 60 seconds elapses, as the driver in the car may not be making enough movement to be sensed, then the count of failures is neither reset to zero nor incremented.

In the preferred embodiment, the fault message is not displayed on the message centre 22 until the driver 24 attempts to arm the security system at which time he will be warned that there is a fault with the ultrasonic sensor by a message such as "ALARM FAULT" for example.

I claim:

1. A security system equipped in a vehicle having at least one vehicle component, the security system comprising:

movement detecting means being provided in the vehicle for detecting movement inside the vehicle;

sensing means being arranged for sensing a state of said component;

control means being electrically coupled to both said movement detecting means and said sensing means; said control means identifying a time period during which movement inside the vehicle would normally be expected; and the control means, upon receiving an input from the sensing means of a time period starting event being indicative of an action instituted by a user of the vehicle, starting the period and monitoring the movement detecting means during said period to determine whether movement inside the vehicle is detected by the movement detecting means and, if movement inside the vehicle is not detected by the movement detecting means during said period, initiating an error procedure;

an ignition switch for the vehicle moveable into and out of a predetermined position, the sensing means comprising switch sensing means for sensing when the ignition switch is moved into said predetermined position; and a door moveable in a predetermined manner, the system further comprising door sensing means for sensing movement of said door, wherein said time period starting event occurs when the ignition switch is moved into said predetermined position and the period ends when the door is moved in said predetermined manner.

2. A system according to claim 1, wherein the control means is arranged to activate the movement detecting means automatically when said time period starting event occurs.

3. A system according to claim 1, wherein the control means has a count value stored therein and said error procedure comprises an alteration of said count value.

4. A system according to claim 3, wherein the control means includes reset means provided to reset said count value if movement is detected within the vehicle during said time period.

5. A system according to claim 3 further comprising fault indication means, wherein the control means is coupled to the fault indication means to indicate an error via the fault indication means when said count value reaches a predetermined value.

6. A system according to claim 1, wherein the movement detecting means comprises a transmitter and a receiver for transmitting and receiving respectively radiant energy of a predetermined wavelength.

7. A system according to claim 6, wherein the transmitter and receiver comprise an ultrasonic sensor.

8. A security system according to claim 1, wherein said system includes an arming mechanism which, when said arming mechanism is armed, is coupled to trigger an alarm in response to detection of movement by said movement detection means.

9. A securing system equipped in a vehicle having at least one vehicle component, the security system comprising:

movement detecting means being provided in the vehicle for detecting movement inside the vehicle;

sensing means being arranged for sensing a state of said component;

control means being electrically coupled to both said movement detecting means and said sensing means; said control means identifying a time period during which movement inside the vehicle would normally be expected; and the control means, upon receiving an input from the sensing means of a time period starting event being indicative of an action instituted by a user of the vehicle, starting the period and monitoring the movement detecting means during said period to determine whether movement inside the vehicle is detected by the movement detecting means and, if movement inside the vehicle is not detected by the movement detecting means during said period, initiating an error procedure;

an ignition switch for the vehicle moveable into and out of a predetermined position, the sensing means comprising switch sensing means for sensing when the ignition switch is moved into said predetermined position, and said time period starting event occurs when the ignition switch is so moved, wherein the control means is arranged to terminate said period on occurrence of a terminating event which is one of a plurality of possible events which can occur after said time period starting event has occurred, and to select which of said possible events will be the terminating event dependent on the sequence in which said possible events occur.

10. A system according to claim 9, wherein the control means is arranged to activate the movement detecting means automatically when said time period starting event occurs.

11. A system according to claim 9, wherein the control means has a count value stored therein and said error procedure comprises an alteration of said count value.

12. A system according to claim 11, wherein the control means includes reset means provided to reset said count value if movement is detected within the vehicle during said time period.

13. A system according to claim 11 further comprising fault indication means, wherein the control means is coupled to the fault indication means to indicate an error via the fault indication means when said count value reaches a predetermined value.

14. A system according to claim 9, wherein the movement detecting means comprises a transmitter and a receiver for transmitting and receiving respectively radiant energy of a predetermined wavelength.

15. A system according to claim 14, wherein the transmitter and receiver comprise an ultrasonic sensor.

16. A system according to claim 15, wherein the system includes an arming mechanism which, when said arming mechanism is armed, is coupled to trigger an alarm in response to detection of movement by said movement detecting means.

17. A security system according to claim 9, wherein said system includes an arming mechanism which, when said arming mechanism is armed, is coupled to trigger an alarm in response of movement by said movement detecting means.

18. A security system equipped in a vehicle having at least one vehicle component, the security system comprising:

movement detecting means being provided in the vehicle for detecting movement inside the vehicle;

sensing means being arranged for sensing a state of said component;

control means being electrically coupled to both said movement detecting means and said sensing means; said control means identifying a time period during which movement inside the vehicle would normally be expected; and the control means, upon receiving an input from the sensing means of a time period starting event being indicative of an action instituted by a user of the vehicle, starting the period and monitoring the movement detecting means during said period to determine whether movement inside the vehicle is detected by the movement detecting means and, if movement inside the vehicle is not detected by the movement detecting means during said period, initiating an error procedure;

wherein the control means is arranged to ignore said period if a time period of a predetermined length expires within said period before any movement is sensed.

19. A system according to claim 18, wherein the control means is arranged to activate the movement detecting means automatically when said time period starting event occurs.

20. A system according to claim 18, wherein the control means has a count value stored therein and said error procedure comprises an alteration of said count value.

21. A system according to claim 20, wherein the control means includes reset means provided to reset said count value if movement is detected within the vehicle during said time period.

22. A system according to claim 20 further comprising fault indication means, wherein the control means is coupled to the fault indication means to indicate an error via the fault indication means when said count value reaches a predetermined value.

23. A system according to claim 18, wherein the movement detecting means comprises a transmitter and a receiver for transmitting and receiving respectively radiant energy of a predetermined wavelength.

24. A system according to claim 23, wherein the transmitter and receiver comprise an ultrasonic sensor.

* * * * *